April 2, 1940.  C. A. ARENS  2,195,400
CONTROL MECHANISM
Filed June 5, 1936  3 Sheets-Sheet 1
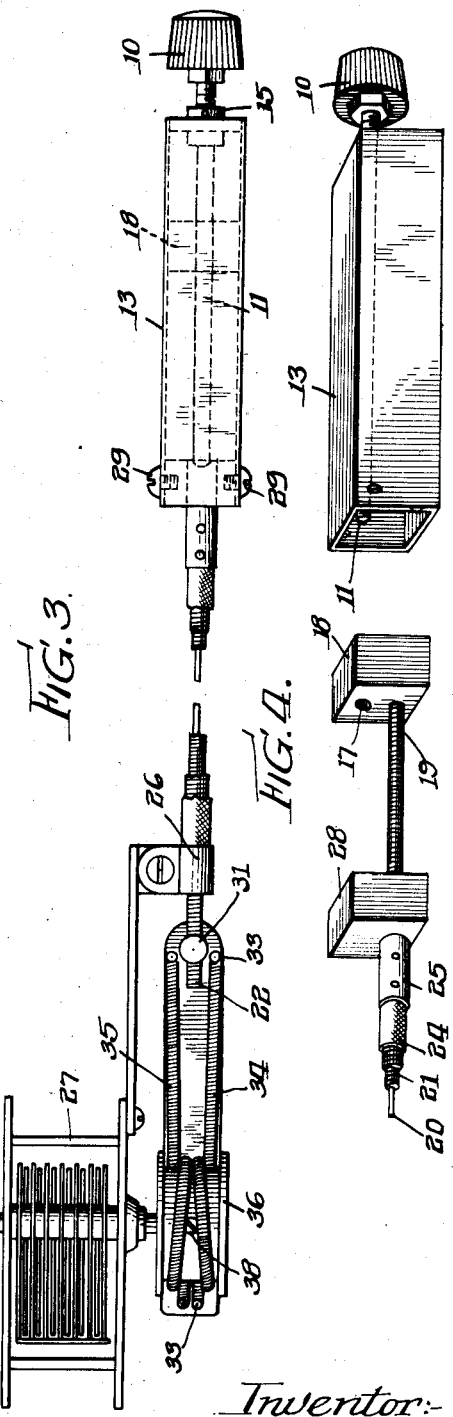
Inventor:-
Charles A. Arens
By:- Cox & Moore attys.

Inventor:
Charles A. Arens
By:- Cox & Moore
attys.

April 2, 1940.
C. A. ARENS
2,195,400
CONTROL MECHANISM
Filed June 5, 1936
3 Sheets-Sheet 3
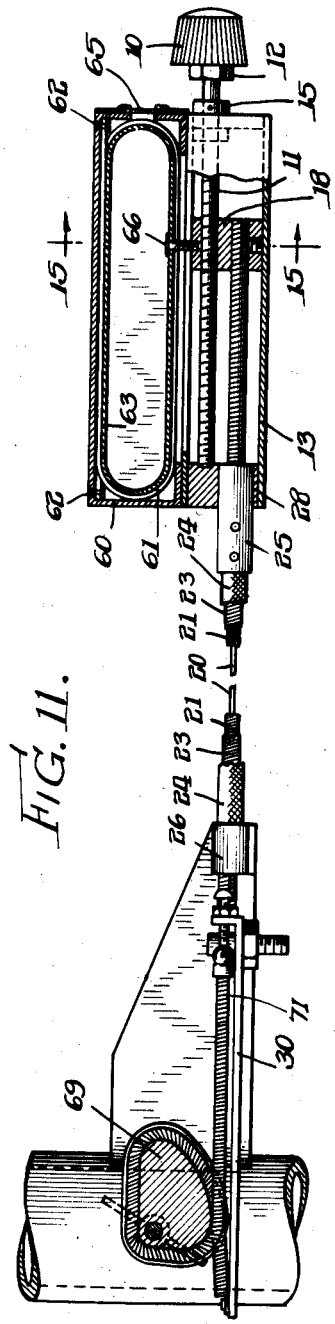
Inventor:
Charles A. Arens
By:- Cox & Moore
attys.

Patented Apr. 2, 1940

2,195,400

UNITED STATES PATENT OFFICE 2,195,400

CONTROL MECHANISM

Charles A. Arens, Chicago, Ill.

Application June 5, 1936, Serial No. 83,668

14 Claims. (Cl. 74—501)

This invention relates to control mechanisms, and more particularly to control mechanisms of the type adapted to effect the accurate adjustment of devices from a remote point.

It is an object of the invention to provide a control mechanism of simplified construction which is rugged and durable and yet which may be readily produced of a minimum number of parts and easily assembled.

Further objects are to provide a control mechanism for effecting accurate adjustment of a device to be operated from a remote point wherein there is no looseness or play in the operating parts as initially assembled, and wherein no play will result from wear of the parts during operation; and to provide a mechanism which can be readily adjusted as occasion requires and easily disassembled for repair purposes or the like. In accordance with the construction of the invention, these and other objects are attained without the use of expensive or accurately machined parts.

Further and important objects of the invention are to provide a simplified mechanism for transforming rotational movement into push-pull movement and then into rotational movement again at a remote point, and to provide a mechanism for translating rotational movement of one character into rotational movement of another character, as uniform movement into variable speed movement.

A still further object of the invention is to provide in a control mechanism of the type stated, a cable operating member which may be operated with a minimum of friction whereby to reduce the operating forces required, minimize initial sticking of the cable parts and insure smooth operation of the control mechanism.

Another object is to provide means for indicating the position of the controlled device.

Other objects and advantages of the invention will appear from the following specification when taken in connection with the accompanying drawings wherein certain preferred embodiments of the invention are illustrated.

In the drawings, wherein like reference numerals refer to like parts throughout:

Fig. 1 is an elevational view, partly in section, illustrating a control mechanism constructed in accordance with one form of the present invention.

Fig. 2 is a view of the device of Fig. 1 but showing the mechanism in a different operating position.

Fig. 3 is a plan view of the construction shown in Figs. 1 and 2.

Fig. 4 is an exploded view illustrating the parts of this form of the control mechanism at the end thereof adjacent the operator's control knob.

Fig. 11 is a view similar to Fig. 1 but showing a modified form of control mechanism.

Fig. 12 is a plan view of the construction of Fig. 11.

Fig. 13 is a detail taken on the line 13—13 of Fig. 12.

Fig. 14 is a detail of a part of the indicator device, and

Fig. 15 is a sectional view on the line 15—15 of Fig. 11.

Figure 5:
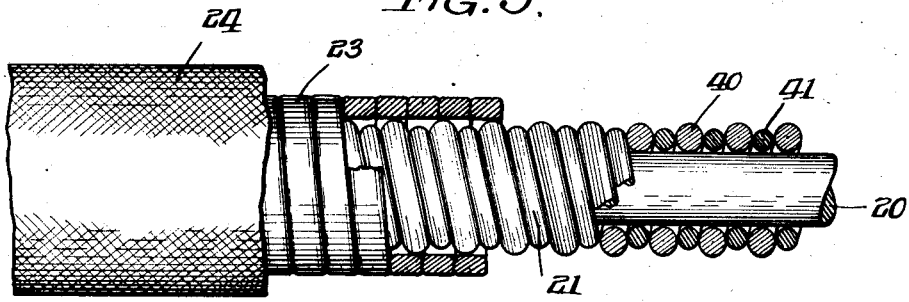
Fig. 5 is a longitudinal view, partially in section of a portion of the control cable.

Referring first to Figs. 1 to 6 inclusive, it will be seen that the embodiment of the invention, here set forth for purposes of illustration, comprises a control knob 10 secured to a rotatable threaded rod 11 by means of a nut 12. The threaded rod is mounted within a casing 13 by means of a pair of collars 14 and 15 which are fixed to the rod in spaced relation and which embrace the end wall 16 of the casing. The rod has threaded engagement with a threaded hole 17 in a block 18 slidable within the casing, the block being moved longitudinally of the casing by rotation of the rod. The end 19 of the movable parts of the operating cable is secured within a second opening within the block 18, the end being fixed to the block by means of soldering or by a set screw or the like.

The movable parts of the operating cable comprise an innner wire 20 encircled by a spiral wire coil 21. The two wires 20 and 21 are permanently fixed together at their ends 19 and 22. This may be conveniently done by dipping the ends into a solder bath. This stiffens the ends and forms a permanent connection between the wires. The two wires 20 and 21 form a flexible cable construction operable in both tension and compression. The wire coil 21 is slidable within a second and stationary spirally wound wire coil 23 which forms a casing or sheath for the slidable wires 20 and 21. The coil 23 may be covered by an outer covering 24 of rubberized fabric or the like to weather-proof and protect the cable construction. The stationary cable parts 23 and 24 are secured at one end to a sleeve 25 and at the other end to a bracket 26 secured to the device to be operated, generally indicated by the numeral 27. The sleeve 25 is secured within a block 28 which is adapted to be fastened to the end of the casing 13 by means of screws 29.

In assembling the parts above described, the collar 14 may be first secured upon the rotatable shaft 11 after which the shaft is inserted through the casing end wall 16. The collar 15 and the control knob 10 may then be secured in position upon the shaft. The shaft 11 is then threaded into the block 18 to which the wire end 19 has been previously secured. The fixed block 28 to which the sleeve 25 and the stationary parts of the cable are secured may then be inserted in position and the screws 29 applied.

The end 22 of the operating wires 20 and 21 is secured to an operating bar 30 by means of a threaded stud 31 which passes through an opening in the bar and through which the wire end 22 may be freely inserted. The stud carries upon its lower threaded portion a nut 32. This nut may be operated to draw the stud downwardly through the bar 30, thus bringing the wire end 22 down into tight engagement with the top of the bar whereby to form a tight connection between the wire end and the bar. The operating bar 30 has anchored to its ends, by means of rivets 33 or the like, a pair of coiled tension springs 34 and 35. These coiled springs tightly embrace a pulley wheel 36 which is secured to the operating shaft 37 of the device to be operated, by means of a set screw 38. In the drawings the operated device is illustrated as the tuning condenser of a radio for air-craft or automotive vehicles as the invention is particularly adapted for use in this connection. However, it is to be understood that the control mechanism of the present invention may be used to operate various types of devices. It is particularly adapted for remotely controlling the radio or carburetor adjustments of airplanes and automobiles or like devices requiring sensitive and accurate control from a remote point.

In operation, as the threaded shaft 11 is rotated by means of the control knob 10, the slidable block 18 will be removed longitudinally of the casing 13, as will be seen by a comparison of Figures 1 and 2, due to the threaded engagement between the shaft and the block. Movement of the block causes corresponding movement of the operating bar 30 due to the connection between these members through the operating cable wires 20 and 21. Movement of the operating bar in turn causes corresponding movement of the shaft 37 of the tuning device by means of the connecting springs 34, 35 and the pulley-wheel 36. The springs, which are under a slight tension, firmly embrace and grip the pulley-wheel. The springs are sufficiently strong in relation to the forces to be transmitted, so that they will not yield to allow any relative movement between the operating bar and the pulley-wheel during operation of the device. The initial tensioning of the springs, however, as they are mounted upon the bar causes them to tightly grip the pulley-wheel. In all positions of the operating bar, the springs are free to find their own position upon the pulley-wheel surface in the manner illustrated in Figure 3.

It will be seen that there is no loose play in the entire operating linkage. The control knob 10 is fixed to the threaded shaft 11. The collars 14 and 15 tightly embrace the end wall 16 of the casing 13. The shaft 11 has screw-threaded engagement with the sliding block 18. The block 18 and the operating bar 30 are firmly secured to the opposite ends of the operating flexible cable 10 wires 20 and 21. The tension springs 34 and 35 tightly embrace the pulley-wheel 36 in all operating positions whereby to insure that there can be no possible lost motion between these parts, and the pulley-wheel is securely fixed to the operating shaft 37 by means of the set screw 38. Not only is there no play or lost motion in the operating linkage as originally assembled, but the construction is such that loose play will not result as the device is operated over protracted periods of time. The threaded connection between the rotatable shaft 11 and the sliding block 18 will withstand a very great amount of use without developing lost motion, and the springs 34 and 35 likewise experience no tendency to become loose during the continued use of the device. Not only is a very sensitive and accurate control of maintained efficiency provided, but no expensive accurately machined parts are required. Thus, the provision of a rack and gear connection between the operating bar 30 and the shaft 37 would require accurately machined parts which are not only expensive to produce, but which inherently develop lost motion due to wear in use. Further, a rack and gear tend to separate as power is transmitted in operation, requiring the use of special guiding devices. There is no such tendency with driving means of the present invention.

The operating bar is entirely suspended by means of the springs from the shaft 37, no other mounting means for the bar being provided. Accordingly, the entire spring construction may be readily removed as a unit from the operated device merely by loosening the set screw 38 and the nut 32. The set screw and the nut also provide two ready means of initial adjustment of the control mechanism with respect to the operated device. The pulley 36 may be secured to the shaft 37 accurately at any desired position by means of the set screw 38, and the end 22 of the operating wires may be accurately adjusted with respect to the position of the stud 31 and the operating bar by loosening the nut 32. Due to the fact that no looseness develops in the construction, adjustment for wear is unnecessary. Accurate alinement between the operating bar 30 and the shaft 37 is not necessary as the springs will function accurately upon the pulley-wheel even when the operating bar is disposed at a considerable angle with respect to the axis of shaft 37. This permits considerable latitude in the relative positioning of the operating cable with respect to the device 27 to be controlled.

Figure 6:
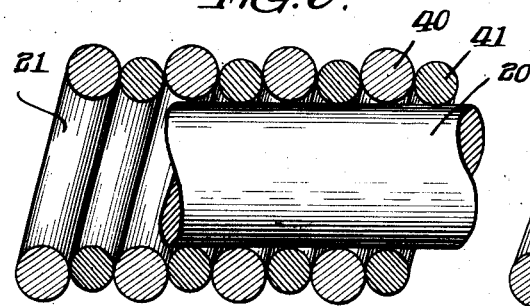
Fig. 6 is a detail of the operating wire coil.

The arrangement for reducing friction between the movable wire coil 21 and the fixed or casing coil 23 is best illustrated in Figs. 5 and 6. As shown, the wire coil 21 is composed of two wires 40 and 41 alternately arranged and wound together upon the inner cable wire 20 to form a double pitch wire coil. The wire 40 is of larger size or gauge than the wire 41 whereby, as both tightly embrace the central cable wire 20, the larger wire 40 will project beyond the smaller wire 41. As a result, only the wire 40 will touch the casing coil 23. The number of points of contact between the slidable cable and the fixed casing per given unit of length is, therefore, reduced by substantially one-half. This reduces the operating friction between the relatively slidable wire coils. There is less tendency for the parts to stick together and lower operating forces from the control knob 10 will be required, thus in cooperation with the springs 34 and 35 insuring smooth and accurate movement of the control mechanism parts.

Figure 7:
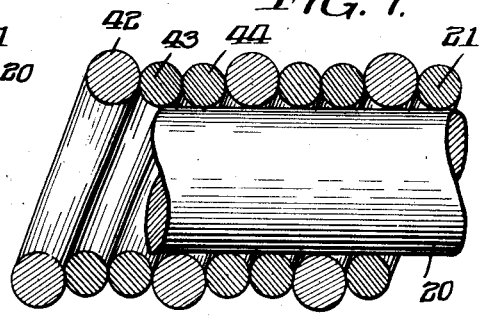
Fig. 7 is a view similar to Fig. 6 but showing a wire coil of modified construction.

In Fig. 7 there is illustrated an alternate form of wire coil 21. In this instance three wires 42, 43 and 44 are wound together upon the inner cable wire 20 whereby to produce a triple pitch coil. One large wire 42 and two small wires 43 and 44 are employed. As a result, the points of contact with the casing coil 23 are even further spaced apart, further reducing the areas of contact between the relatively sliding parts per unit length of cable and further reducing frictional resistance.

Figure 8:
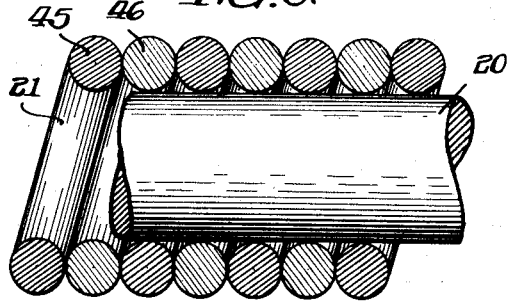
Fig. 8 is a view similar to Fig. 6 but showing a wire coil of a still further modified form.
Figure 9:
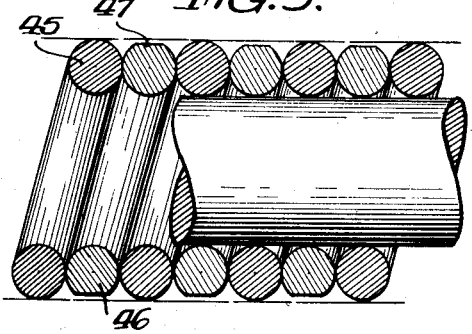
Fig. 9 illustrates the wire of Fig. 8 as it appears after wear has occurred by reason of continued operation.

In Fig. 8, illustrating a second modified form of the invention, the coil 21 is composed of a relatively hard wire 45 and a wire 46 of softer material wound together upon the cable wire 20 as in the embodiment of Fig. 6. As the control device is used, the soft wire will wear down at 47 as indicated in Fig. 9. After the parts have been worn-in, only the hard wire will contact the casing coil 23, thus producing a reduction of frictional contacting areas as in the previously described embodiments of the invention.

Figure 10:
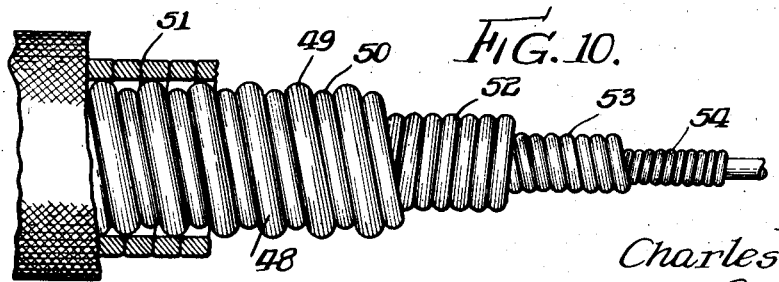
Fig. 10 is a view similar to Fig. 5 but showing a different form of operating cable.

In Fig. 10 a wire coil 48 composed of alternately wound large and small wires 49 and 50, as in Fig. 6, is illustrated in a cable construction adapted for rotational as distinguished from sliding movement within a stationary casing coil 51. The rotating cable parts comprise the coil 48 and inner coils 52, 53 and 54 of successively smaller sizes. The individual operating coils are alternately wound in right and left hand directions whereby to produce a composite rotating cable structure which will transmit both clockwise and counterclockwise rotational movements. The largest rotating coil 48 which contacts the stationary casing coil 51, by reason of its composition of alternately arranged large and small wires, provides for reduced frictional contact between the relatively moving parts, thus reducing frictional forces as previously described.

In Figures 11 to 15 inclusive there is shown a modified form of construction embodying indicating means for showing the adjusted position of the control mechanism, and wherein means is provided for translating uniform movement of the control knob 10 into variable speed movement of the device to be controlled. Means are also provided for adjusting the tension of the springs which connect the operating bar with the shaft of the controlled device.

The indicator structure comprises a housing 60 mounted upon the casing 13 which carries the threaded shaft 11 and the slidable block 18. Mounted within the housing 60 is a pair of guiding bars 61, one of which is shown in perspective view in Fig. 14. The guiding bars may be secured at their ends to the housing 60 by means of pins 62, if desired, or the guiding bars may be held in position within the housing merely by their own resiliency. The guiding bars are arranged at opposite sides of the housing as best shown in Figs. 12 and 15. The guiding bars form a track or guide for the indicator element proper which comprises an endless band 63. This band is provided with suitable designations 64 along the central portion thereof which are viewable through a window 65 at the front of the housing 60. The slidable block 18 carries a stud 66. This stud projects upwardly from the slidable block through slots formed in the casings 13 and 60 and between the guide bars 61. It is secured to the endless indicator band 63 and serves as a means for moving the indicator band with the sliding block. It will thus be seen that as the block 18 is moved within the housing 13 by adjustment of the control knob 10, the indicator band is correspondingly moved to bring the various designations thereon into view through the window 65. The position of the sliding block, and correspondingly the position of the controlled device is thus accurately indicated at all times.

In the control mechanism of Figs. 11 and 12 means are provided for transforming uniform rotational movement of the control knob 10 into variable speed motion of the shaft 68 of the device to be controlled. This means comprises a cam 69 pinned to the shaft by a set screw 70 and about which the tension springs 71 and 72 are wrapped. The tension springs are anchored at their ends to the operating bar 30 and are constrained for movement therewith as in the previously described embodiment of the invention. Due to the fact that the periphery of the cam 69 is non-circular, uniform motion of the operating bar 30 induced by uniform rotation of the control knob 10 will cause variable speed rotation of the shaft 68. Or, stating it another way, a given increment of movement of the operating bar will cause a greater or smaller corresponding increment of movement of the shaft 68 depending upon which portion of the periphery of the cam is in operative juxtaposition to the operating bar. By variously shaping the contour of the cam various relations between the movements of the operating bar 30 and the shaft 68 may be obtained. Different cams having different contours and accordingly different operating characteristics may be readily substituted upon the shaft 68 merely by loosening the set screw 70 and by substitution of the proper cam. In view of the fact that the operating bar is suspended from the cam without the necessity of guiding means or the like, the operating bar mounting readily adapts itself to cams of various contours.

In Figs. 11 and 12 the operated device is illustrated as a valve 73. However, as previously stated, the invention is adapted for use with various types of devices to be operated. It will be seen that the contour of the cam 69 may be shaped to impart the desired operating characteristics to the valve 73 upon manipulation of the control knob 10.

Means are also provided for adjusting the tension of the springs 71 and 72 as occasion may require, and to insure that the springs will not slip upon the periphery of the cam. This means, as best shown in Fig. 13, comprises a bolt 75 threaded into the projection 76 extending upwardly from the end of the operating bar 30. The bolt carries a ball 77 at its end which engages within a socket member 78 secured to the end of the spring. The bolt 75 may be rotated to impart the proper tension to the spring after which the lock nut 79 may be manipulated to lock the bolt in adjusted position. There is an adjusting bolt 75 for each of the springs 71 and 72.

It is obvious that various changes may be made in the specific embodiments of the invention shown for purposes of illustration. The invention is, therefore, not to be limited to the precise embodiments shown and described, but only as indicated in the following claims.

The invention is hereby claimed as follows:

1. In a power transmission mechanism, a transmission linkage including a reciprocable member and a rotary member adapted to be actuated therewith, and a spring connecting said members for transmitting power from one to the other, said spring being arranged to directly transmit the power between the members but being unyielding at the power transmitted.

2. In a control mechanism, a control linkage comprising a reciprocable member and a rotary member, a spring forming an operative connection between said members for transforming movement of one into corresponding movement of the other, said spring being fixed to both of said members and being initially tensioned, but being unyielding at the normal forces transmitted.

3. In a control mechanism, a control linkage comprising a reciprocable member and a rotary member, a spring connecting said members for transforming movement of one into corresponding movement of the other, said spring embracing the rotary member and being anchored to the reciprocable member at points thereon oppositely disposed with respect to the rotary member.

4. In a control mechanism, a control linkage comprising a reciprocable member and a rotary member, a spring connecting said members for transforming movement of one into corresponding movement of the other, said spring embracing the rotary member and being anchored to the reciprocable member at points thereon oppositely disposed with respect to the rotary member, said rotary member having a cam shaped surface whereby to impart predetermined relative movement between the reciprocable member and the rotary member.

5. In a control mechanism, a control linkage comprising a reciprocable member and a rotary member, a spring encircling the rotary member and anchored to the reciprocable member for transmitting movement between said members, said spring being resiliently urged into gripping engagement with the rotary member, a transmission member connected at one end to the reciprocable member, and a control knob having connections for moving the other end of the transmission member.

6. In a control mechanism, a control linkage comprising a reciprocable member and a rotary member, a spring encircling the rotary member and anchored to the reciprocable member for transmitting movement between said members, said spring being resiliently urged into gripping engagement with the rotary member, a transmission member connected at one end to the reciprocable member, and a control knob having connections for moving the other end of the transmission member, said connections comprising a longitudinally movable block, a rotary shaft, means for connecting said other end of the transmission member to the block and for connecting the shaft to the control knob, said shaft and block being in screw-threaded engagement whereby rotation of the shaft produces longitudinal movement of the block, and means for indicating the position of said block.

7. In a control mechanism, a control linkage comprising a reciprocable member and a rotary member, a band encircling the rotary member and anchored to the reciprocable member for transmitting movement between said members, said band being resiliently urged into gripping engagement with the rotary member, a transmission cable connected at one end to the reciprocable member, a sheath for said cable in which the cable moves, and means for reducing friction between said cable and sheath.

8. In a control mechanism, a control linkage comprising a reciprocable member and a rotary member, a band encircling the rotary member and anchored to the reciprocable member for transmitting movement between said members, said band being resiliently urged into gripping engagement with the rotary member, a transmission cable connected at one end to the reciprocable member, a sheath for said cable in which the cable moves, means for reducing friction between said cable and sheath, and a control knob having connections for moving the other end of the transmission cable.

9. In a control mechanism, a transmission cable, and a sheath for the cable in which the cable moves, said cable comprising a central core and a wire coil wound upon the central core, said wire coil comprising alternately spaced helically wound hard and soft wires, the soft wire being adapted to wear down by continued engagement with the sheath whereby on use of the mechanism to reduce the areas of contact between the wire coil and the sheath per unit cable length.

10. In a control mechanism, a control linkage comprising a reciprocable member and a rotary member, a resilient element connecting said members for transforming movement of one into corresponding movement of the other, said resilient element embracing the rotary member and being anchored to the reciprocable member at points thereon oppositely disposed with respect to the rotary member.

11. In a control mechanism, a control linkage comprising a reciprocable member and a rotary member, a spring connecting said members for transforming movement of one into corresponding movement of the other, said spring embracing the rotary member and being anchored to the reciprocable member at points thereon oppositely disposed with respect to the rotary member, and said spring constituting the sole means of holding the reciprocable member in position with respect to the rotary member.

12. In a control mechanism, a control linkage comprising a reciprocable member and a rotary member, a band encircling the rotary member and anchored to the reciprocable member for transmitting movement between said members, said band being urged into gripping engagement with the rotary member, a transmission cable connected at one end to the reciprocable member, and a sheath for said cable in which the cable moves, said cable having spaced points of contact with the sheath whereby to reduce friction between the cable and sheath.

13. In a control mechanism, a transmission cable, and a sheath for the cable in which the cable moves, said cable comprising a wire coil of alternately spaced helically wound hard and soft wires, the soft wire being adapted to wear down by continued engagement with the sheath whereby on use of the mechanism to reduce the areas of contact between the wire coil and the sheath per unit cable length.

14. In a power transmission mechanism, a transmission linkage including a reciprocable member and a rotary member adapted to be actuated therewith, and a resilient element embracing the rotary member and connecting said members for directly transmitting power from one to the other, said resilient element being substantially expansible to increase its length by at least ten per cent without permanently deforming the material of said element but being substantially unyielding at the power transmitted, the resilient expansibility of said element being operable to cause the element to grip said rotary member.

CHARLES A. ARENS.